(12) United States Patent
Araki et al.

(10) Patent No.: US 10,315,529 B2
(45) Date of Patent: Jun. 11, 2019

(54) COOLING SYSTEM AND WIRELESS POWER TRANSFER SYSTEM

(71) Applicant: IHI CORPORATION, Tokyo (JP)

(72) Inventors: Jun Araki, Tokyo (JP); Motonao Niizuma, Tokyo (JP); Susumu Tokura, Tokyo (JP); Eiichi Urushibata, Tokyo (JP); Hideo Naganuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/556,495

(22) PCT Filed: May 20, 2016

(86) PCT No.: PCT/JP2016/065060
§ 371 (c)(1),
(2) Date: Sep. 7, 2017

(87) PCT Pub. No.: WO2016/190252
PCT Pub. Date: Dec. 1, 2016

(65) Prior Publication Data
US 2018/0072182 A1 Mar. 15, 2018

(30) Foreign Application Priority Data
May 27, 2015 (JP) ................. 2015-107563

(51) Int. Cl.
*B60L 11/18* (2006.01)
*H02J 7/00* (2006.01)
(Continued)

(52) U.S. Cl.
CPC ......... *B60L 11/1874* (2013.01); *B60L 3/0046* (2013.01); *B60L 53/12* (2019.02);
(Continued)

(58) Field of Classification Search
USPC .................................. 320/108, 150
See application file for complete search history.

(56) References Cited

U.S. PATENT DOCUMENTS

2008/0012535 A1  1/2008 Takatsuji
2010/0072946 A1  3/2010 Sugano
(Continued)

FOREIGN PATENT DOCUMENTS

JP    2008016230 A    1/2008
JP    2009044887 A    2/2009
(Continued)

OTHER PUBLICATIONS

International Search Report issued in corresponding International Patent Application No. PCT/JP2016/065060 dated Jul. 26, 2017, consisting of 5 pp. (English Translation Provided).
(Continued)

*Primary Examiner* — Robert J Grant
(74) *Attorney, Agent, or Firm* — Volpe and Koenig, P.C.

(57) ABSTRACT

A cooling system includes a cooling unit configured to cool at least one of a power reception unit configured to wirelessly receive power from a power transmission unit and a power storage unit configured to store the power received by the power reception unit; and a controller configured to control the cooling unit. The cooling unit is operated by the power received by the power reception unit, and the controller controls the cooling unit on the basis of a necessary amount of charge of the power storage unit.

10 Claims, 3 Drawing Sheets

(51) Int. Cl.
*H01M 10/625* (2014.01)
*H01M 10/633* (2014.01)
*H01M 10/6563* (2014.01)
*H01M 10/6567* (2014.01)
*H01M 10/613* (2014.01)
*H02J 50/00* (2016.01)
*H01M 10/651* (2014.01)
*H02J 50/90* (2016.01)
*H02J 50/12* (2016.01)
*B60L 3/00* (2019.01)
*H01M 10/48* (2006.01)
*H02J 7/02* (2016.01)
*B60L 53/12* (2019.01)
*B60L 53/60* (2019.01)
*B60L 58/12* (2019.01)

(52) U.S. Cl.
CPC .............. *B60L 53/60* (2019.02); *B60L 58/12* (2019.02); *H01M 10/486* (2013.01); *H01M 10/613* (2015.04); *H01M 10/625* (2015.04); *H01M 10/633* (2015.04); *H01M 10/651* (2015.04); *H01M 10/6563* (2015.04); *H01M 10/6567* (2015.04); *H02J 7/00* (2013.01); *H02J 7/025* (2013.01); *H02J 50/00* (2016.02); *H02J 50/12* (2016.02); *H02J 50/90* (2016.02); *B60L 2240/36* (2013.01); *Y02T 10/7005* (2013.01); *Y02T 10/7077* (2013.01); *Y02T 90/122* (2013.01)

(56) References Cited

U.S. PATENT DOCUMENTS

| | | |
|---|---|---|
| 2010/0324765 A1 | 12/2010 | Iida |
| 2014/0021914 A1* | 1/2014 | Martin .................. H02H 5/045 |
| | | 320/109 |
| 2014/0225559 A1 | 8/2014 | Sugano |
| 2014/0322570 A1 | 10/2014 | Nakamura et al. |
| 2016/0214495 A1 | 7/2016 | Murata et al. |

FOREIGN PATENT DOCUMENTS

| | | |
|---|---|---|
| JP | 2009131131 A | 6/2009 |
| JP | 2010233360 A | 10/2010 |
| JP | 2010268660 A | 11/2010 |
| JP | 2011125184 A | 6/2011 |
| JP | 2012104458 A | 5/2012 |
| JP | 2013123307 A | 6/2013 |
| JP | 2013135572 A | 7/2013 |
| JP | 2015-043662 A | 3/2015 |
| WO | 2008132782 A1 | 6/2008 |
| WO | 2013/094050 A1 | 6/2013 |
| WO | 2015/028865 A2 | 3/2015 |

OTHER PUBLICATIONS

Written Opinion issued in corresponding International Patent Application No. PCT/JP2016/065060 dated Jul. 26, 2017, consisting of 6 pp.

* cited by examiner

COOLING SYSTEM AND WIRELESS POWER TRANSFER SYSTEM

TECHNICAL FIELD

The present disclosure relates to a cooling system and a wireless power transfer system. This application is based upon and claims the benefit of priority from Japanese Patent Application No. 2015-107563, filed on May 27, 2015, the entire contents of which are incorporated herein by reference.

BACKGROUND ART

Technology for cooling a power reception unit and a power storage unit in a wireless power transfer system is conventionally known. As such technology, for example, a wireless power receiver, which changes a cooling capability of a cooling device according to power reception efficiency of the power reception unit is disclosed in Patent Document 1. In Patent Document 2, a wireless power transmitter which controls a temperature control means of an alternating current (AC) power supply according to an operation state of a power transmission unit is disclosed.

CITATION LIST

Patent Document

[Patent Document 1] Japanese Unexamined Patent Publication No. 2013-135572
[Patent Document 2] Japanese Unexamined Patent Publication No. 2013-123307

SUMMARY

Technical Problem

Electric power for operating a cooling unit that cools a power reception unit or the like may be a part of power wirelessly received by the power reception unit from a power transmission unit. In this case, power with which a power storage unit is charged is reduced by the operation of the cooling unit. In the technologies described in the above described Patent Document 1 and Patent Document 2, a decrease in the power with which the power storage unit is charged due to the operation of the cooling unit is not considered. Thus, it is difficult to perform cooling while efficiently performing charging.

In the present disclosure, a cooling system and a wireless power transfer system capable of performing cooling while efficiently performing charging are described.

Solution to Problem

According to an aspect of the present disclosure, a cooling system includes a cooling unit configured to cool at least one of a power reception unit configured to wirelessly receive power from a power transmission unit and a power storage unit configured to store the power received by the power reception unit; and a control unit configured to control the cooling unit, wherein the cooling unit is operated by the power received by the power reception unit, and the control unit controls the cooling unit on the basis of a necessary amount of charge of the power storage unit.

Effects

According to an aspect of the present disclosure, it is possible to perform cooling while efficiently performing charging.

DESCRIPTION OF EMBODIMENTS

Figure 1:
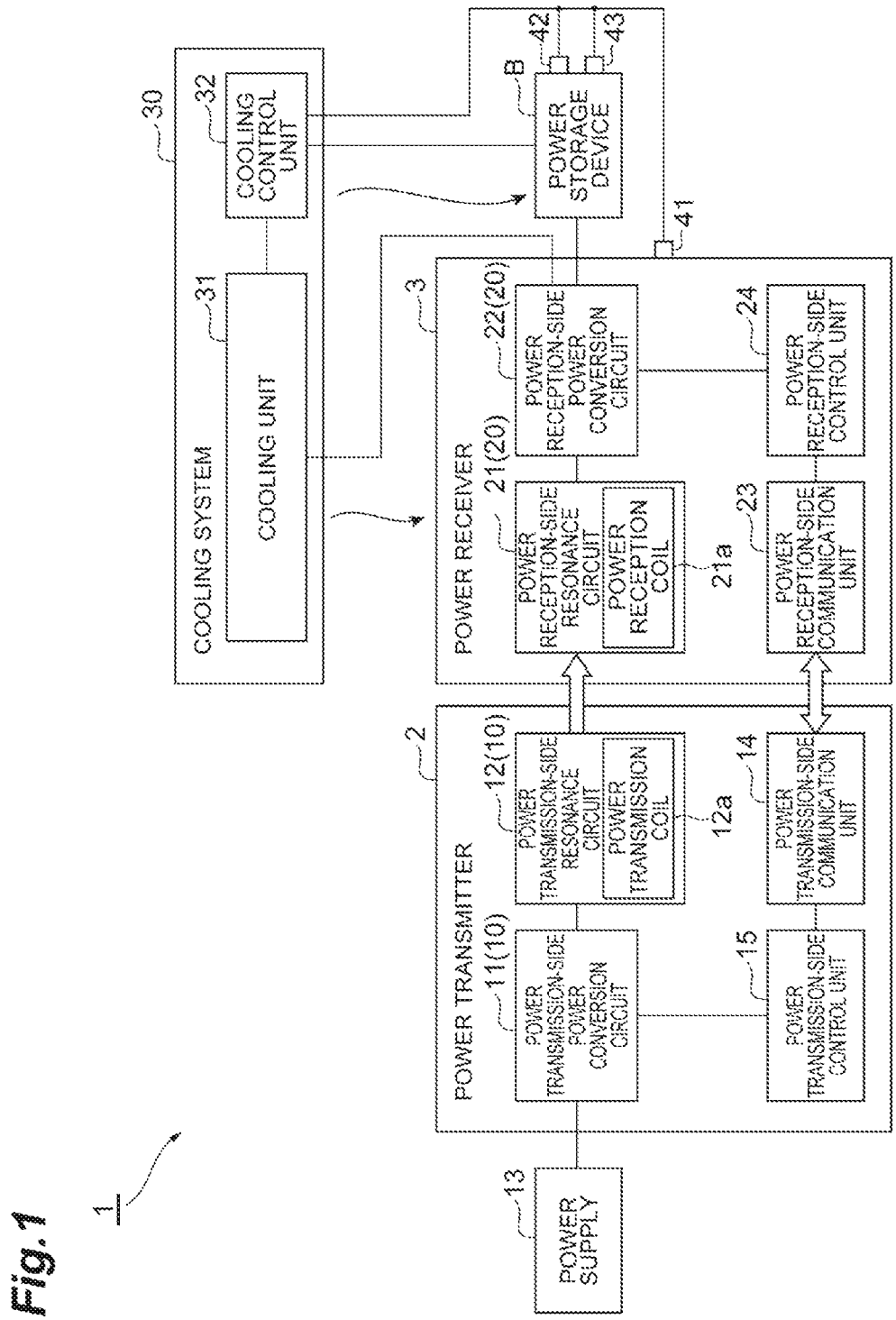
FIG. 1 is a block diagram illustrating a configuration of a wireless power transfer system according to an embodiment of the present disclosure.

According to an aspect of the present disclosure, a cooling system includes a cooling unit configured to cool at least one of a power reception unit configured to wirelessly receive power from a power transmission unit and a power storage unit configured to store the power received by the power reception unit; and a control unit configured to control the cooling unit, wherein the cooling unit is operated by the power received by the power reception unit, and wherein the control unit controls the cooling unit on the basis of a necessary amount of charge of the power storage unit.

This cooling system includes the control unit configured to control the cooling unit on the basis of the necessary amount of charge of the power storage unit. Heat generation related to power reception and charging (a degree to which the power reception unit and the power storage unit are heated) corresponds to the amount of power with which the power storage unit is charged (that is, the necessary amount of charge). Thus, for example, in the case in which a necessary amount of charge corresponding to a degree of heat generation which does not require cooling, it is possible to prevent a decrease of the power with which the power storage unit is charged by controlling the cooling unit so that the cooling unit does not operate. Therefore, it is possible to perform cooling while efficiently charging.

In some aspects, the control unit may calculate the necessary amount of charge on the basis of a difference between a target charging rate of the power storage unit and a present charging rate of the power storage unit. In this case, it is possible to easily calculate the necessary amount of charge according to the difference between the target charging rate of the power storage unit and the present charging rate of the power storage unit.

In some aspects, the control unit may control the cooling unit so that the power reception unit is cooled if a temperature of the power reception unit is greater than or equal to a first temperature threshold value, the control unit may control the cooling unit so that the power storage unit is cooled if a temperature of the power storage unit is greater than or equal to a second temperature threshold value, and the control unit may set the first temperature threshold value and the second temperature threshold value to larger values as the necessary amount of charge increases. In this case, for example, it is possible to prevent a failure of the power reception unit and a deterioration of the power storage unit while efficiently performing charging by setting the first temperature threshold value to a value smaller than or equal to an allowable temperature of the power reception unit and setting the second temperature threshold value to a value smaller than or equal to an allowable temperature of the power storage unit.

In some aspects, the power reception unit may include a power reception coil configured to wirelessly receive the power from a power transmission coil of the power transmission unit, and the control unit may set the first temperature threshold value of when a misalignment between the power transmission coil and the power reception coil is in a first state to a value smaller than a first temperature threshold value of when the misalignment is in a second state in which the misalignment is less than in the first state. If the misalignment between the power transmission coil and the power reception coil (a misalignment between power transmission and reception) increases, heat generation of the power reception unit during power reception may increase. Therefore, it is possible to reliably cool the power reception unit by setting the first temperature threshold value of when the misalignment between power transmission and reception is in the first state to a value smaller than a first temperature threshold value of when the misalignment is in the second state in which the misalignment between power transmission and reception is less than in the first state.

In some aspects, the control unit may calculate a first temperature rising rate which is a temperature rising rate of the power reception unit and a second temperature rising rate which is a temperature rising rate of the power storage unit, the control unit may set the first temperature threshold value to a value larger than the second temperature threshold value if the first temperature rising rate is less than the second temperature rising rate, and the control unit may set the first temperature threshold value to a value smaller than the second temperature threshold value if the first temperature rising rate is greater than the second temperature rising rate. For example, a time period during which the power reception unit is cooled is shortened, because a speed at which the power reception unit is cooled by the cooling unit relatively increases as the first temperature rising rate decreases if amounts of heat of the power reception unit and the power storage unit to be cooled by the cooling unit are constant. Likewise, a time period in which the power storage unit is cooled is shortened, because a speed at which the power storage unit is cooled by the cooling unit relatively increases as the second temperature rising rate decreases. That is, it is possible to delay a cooling start by increasing the first temperature threshold value as the first temperature rising rate decreases. Likewise, it is possible to delay the cooling start by increasing the second temperature threshold value as the second temperature rising rate decreases. Thereby, the operation of the cooling unit can be further suppressed and a decrease in power with which the power storage unit is charged can be further suppressed.

In some aspects, the control unit may calculate a target temperature of the power reception unit at which power efficiency is maximized, and the control unit may control the cooling unit so that a temperature of the power reception unit becomes the target temperature if the necessary amount of charge is less than a predetermined power. In this case, there is a margin for using power for cooling the power reception unit, because the necessary amount of charge is small. Consequently, it is possible to actively perform cooling so that power efficiency is maximized. Also, it is possible to decrease heat generation by maximizing the power efficiency and to suppress power for use in cooling.

In some aspects, the control unit may control the cooling unit so that the power storage unit is cooled if the necessary amount of charge is less than the predetermined power. In this case, because the necessary amount of charge is small, there is a margin for using power for cooling the power storage unit. It is possible to prevent deterioration of the power storage unit by actively cooling the power storage unit.

According to an aspect of the present disclosure, a wireless power transfer system includes the cooling system; the power transmission unit configured to wirelessly transmit the power to the power reception unit; the power reception unit; and the power storage unit. In this wireless power transfer system, heat generation related to power reception and charging (a degree to which the power reception unit and the power storage unit are heated) corresponds to an amount of power with which the power storage unit is charged (that is, the necessary amount of charge). Thus, for example, in the case in which the necessary amount of charge corresponding to the degree of heat generation which does not require cooling, it is possible to prevent the decrease of the power with which the power storage unit is charged by controlling the cooling unit so that the cooling unit is not operated. Therefore, it is possible to perform cooling while efficiently charging.

Hereinafter, embodiments of the present disclosure will be described with reference to the drawings. Also, the same elements are denoted by the same reference signs in the description of the drawings, and redundant descriptions thereof may be omitted.

As illustrated in FIG. 1, a wireless power transfer system 1 is a system for charging a power storage device (a power storage unit) B. The wireless power transfer system 1 is mounted on a moving body such as, for example, an electric vehicle or an underwater vehicle. The wireless power transfer system 1 is configured to include a power transmitter 2, a power receiver 3, and a cooling system 30 having a cooling unit 31 and a cooling control unit (a control unit) 32. The power transmitter 2 is configured to wirelessly transmit electric power to the power receiver 3.

The power transmitter 2 includes a power transmission unit 10, a power transmission-side communication unit 14, and a power transmission-side control unit 15. The power transmission unit 10 is connected to a power supply 13 and is a device (a power transmitter) for wirelessly transmitting power from the power supply 13 to the power reception unit 20. The power transmission unit 10 includes a power transmission-side power conversion circuit 11 and a power transmission-side resonance circuit 12.

The power transmission-side power conversion circuit 11 is a circuit that converts power supplied from the power supply 13 into high frequency power. For example, when AC power is supplied from the power supply 13, the power transmission-side power conversion circuit 11 includes an AC/direct current (DC) conversion circuit and a DC/AC conversion circuit. The AC/DC conversion circuit converts AC power from the power supply 13 into DC power, and includes, for example, a rectifier. The AC/DC conversion circuit includes a step-up power factor correction (PFC) circuit, and can have a power factor improving function and a step-up function. The DC/AC conversion circuit converts DC power into AC power (high frequency power) having a frequency higher than the AC power of the power supply 13, and is, for example, an inverter circuit. The power transmission-side power conversion circuit 11 transmits the high frequency power obtained through the conversion to the power transmission-side resonance circuit 12. When DC power is supplied from the power supply 13, it is possible to remove the AC/DC conversion circuit from the power transmission-side power conversion circuit 11. In order to convert the DC power from the power supply 13 into desired DC power, the power transmission-side power conversion circuit 11 may include a DC/DC converter.

The power transmission-side resonance circuit 12 wirelessly supplies the power supplied from the power transmission-side power conversion circuit 11 to the power receiver 3. The power transmission-side resonance circuit 12 includes a power transmission coil 12a. The power transmission coil 12a is a coil for wirelessly feeding the power supplied from the power transmission-side power conversion circuit 11 to the power receiver 3. The power transmission coil 12a has, for example, a predefined coil shape and dimensions. The power transmission coil 12a may be of a circular type or a solenoid type. The power transmission-side resonance circuit 12 implements a wireless power transfer to the power receiver 3 by applying the high frequency power from the power transmission-side power conversion circuit 11 to the power transmission coil 12a. In addition to the power transmission coil 12a, the power transmission-side resonance circuit 12 has at least one capacitor and can further include an inductor. The capacitor and the inductor are connected to the power transmission coil 12a in parallel or in series. Thereby, various circuit topologies are formed.

As an example, in the power transmission-side resonance circuit 12, a magnetic coupling circuit is formed with the power reception-side resonance circuit 21 including the power reception coil 21a. More specifically, the magnetic coupling circuit is formed by aligning the power transmission coil 12a and the power reception coil 21a to be in close proximity. This magnetic coupling circuit refers to a circuit in which the power transmission coil 12a and the power reception coil 21a are magnetically coupled to each other so that a wireless power transfer from the power transmission coil 12a to the power reception coil 21a is performed. The magnetic coupling circuit here is a circuit that performs power feeding in a "magnetic field resonance scheme." The power transmission-side resonance circuit 12 enables the wireless power transfer by transmitting the power from the power transmission coil 12a to the power reception coil 21a via the magnetic coupling circuit. The magnetic coupling circuit may be a circuit that performs power feeding in an "electromagnetic induction scheme."

The power supply 13 supplies power required for the power transmission unit 10 to generate power for charging the power storage device B. For example, the power supply 13 supplies three-phase AC power having a voltage of 200 [V]. This power supply 13 is not limited to three-phase AC power, but may be a power supply that supplies single-phase AC power such as a commercial AC power supply, or a power supply that supplies DC power such as a photovoltaic power generation system. The power supply 13 may supply power of a voltage different from 200 [V].

The power transmission-side communication unit 14 is a wireless communication interface. The power transmission-side communication unit 14 communicates with the power reception-side communication unit 23 provided in the power receiver 3. For example, a wireless LAN, Bluetooth (registered trademark), or the like can be used as the power transmission-side communication unit 14.

The power transmission-side control unit 15 is, for example, an electronic control unit including a central processing unit (CPU), a read only memory (ROM), a random access memory (RAM), and the like. The power transmission-side control unit 15 controls power supply from the power transmission unit 10 to the power reception unit 20. The power transmission-side control unit 15 controls the power transmission unit 10 so that a magnitude of the power supplied from the power transmission unit 10 to the power reception unit 20 is changed. The power transmission-side control unit 15 controls, for example, switching of an inverter in the power transmission-side power conversion circuit 11.

The power receiver 3 is configured to include the power reception unit 20, the power reception-side communication unit 23, and a power reception-side control unit 24. The power reception unit 20 is a device (a power receiver) for receiving power wirelessly supplied from the power transmission coil 12a. The power reception unit 20 is configured to include the power reception-side resonance circuit 21 and a power reception-side power conversion circuit 22.

The power reception-side resonance circuit 21 receives the power wirelessly supplied from the power transmission-side resonance circuit 12 and transmits the received power to the power reception-side power conversion circuit 22. The power reception-side resonance circuit 21 includes the power reception coil 21a. The power reception coil 21a is a coil for receiving power (AC power) wirelessly supplied from the power transmission coil 12a of the power transmission-side resonance circuit 12. The power reception coil 21a has, for example, substantially the same coil shape and dimension as the power transmission coil 12a. The power reception coil 21a may be of a circular type or a solenoid type. In addition to the power reception coil 21a, the power reception-side resonance circuit 21 has at least one capacitor, and can further include an inductor. The capacitor and the inductor are connected to the power reception coil 21a in parallel or in series. Thereby, various circuit topologies are formed.

The power reception-side power conversion circuit 22 is a circuit that rectifies high frequency power transmitted from the power reception-side resonance circuit 21 and converts the rectified power into DC power. The power reception-side power conversion circuit 22 includes, for example, a rectifier and a DC/DC converter circuit. The power reception-side power conversion circuit 22 converts the high frequency power from the power reception-side resonance circuit 21 into DC power. The power reception-side power conversion circuit 22 supplies the DC power obtained through the conversion to the cooling unit 31 of the cooling system 30.

The power reception unit 20 generates heat due to power received from the power transmission coil 12a. The heat generation of the power reception unit 20 will be described in detail. In the power reception-side resonance circuit 21, elements such as the power reception coil 21a, a capacitor, an inductor, a ferrite, and a coil wire generate heat when power is received from the power transmission coil 12a. In the power reception-side power conversion circuit 22, a rectifier generates heat when rectifying the power received by the power reception-side resonance circuit 21. When a distance between the power transmission coil 12a and the power reception coil 21a changes and a misalignment between power transmission and power reception occurs, impedance of the power reception-side resonance circuit 21 changes and heat generation in the power reception unit 20 may increase. Misalignment between power transmission and reception means, for example, that the power transmission coil 12a and the power reception coil 21a deviate from a desired positional relationship. The desired positional relationship is, for example, a positional relationship in which maximum power efficiency is realized, a positional relationship in which the center of the power transmission coil 12a and the center of the power reception coil 21a face each other, or a positional relationship previously defined in a specification, a use manual, or the like of the wireless power transfer system 1. Also, a waveform of the AC power in the power reception-side resonance circuit 21 is distorted due to the misalignment between power transmission and reception, and harmonic components of the AC power are increased. Thus, in the power reception-side power conversion circuit 22, loss in the rectifier increases, and heat generation in the power reception-side power conversion circuit 22 may increase. In the power reception-side power conversion circuit 22, for example, impedance and reactance of the power reception coil 21a change due to heat generation, and the power transmission performance and the power reception performance change.

The power reception unit 20 includes, for example, a temperature sensor 41 that detects a temperature $T_A$ of the power reception unit 20. The temperature $T_A$ detected by the temperature sensor 41 is transmitted to the cooling control unit 32 of the cooling system 30. The power reception unit 20 is cooled by the cooling unit 31 of the cooling system 30 so that the temperature $T_A$ of the power reception unit 20 is less than an allowable temperature (a heat resistant temperature) $T_{AM}$ of the power reception unit 20. The allowable temperature $T_{AM}$ is, for example, a maximum temperature allowed from a viewpoint of temperature durability of the power reception unit 20.

The power storage device B stores the power received by the power reception unit 20. The power storage device B includes a chargeable battery (for example, a secondary battery such as a lithium ion battery or a nickel hydrogen battery). The power storage device B includes, for example, a charging rate sensor 42 that detects a present state of charge (SOC) (a charging rate) of the power storage device B. The present SOC detected by the charging rate sensor 42 is transmitted to the cooling control unit 32 of the cooling system 30.

The power storage device B generates heat due to the power received from the power reception-side power conversion circuit 22. More specifically, when the power storage device B is charged with power from the power reception-side power conversion circuit 22, heat is generated by a chemical reaction and Joule heat. The power storage device B includes, for example, a temperature sensor 43 that detects a temperature $T_B$ of the power storage device B. The temperature $T_B$ detected by the temperature sensor 43 is transmitted to the cooling control unit 32 of the cooling system 30. The power storage device B is cooled by the cooling unit 31 of the cooling system 30 so that the temperature $T_B$ of the power storage device B is less than an allowable temperature (a heat resistant temperature) $T_{BM}$ of the power storage device B. The allowable temperature $T_{BM}$ is, for example, a maximum temperature allowed from a viewpoint of deterioration of the power storage device B due to a temperature.

The power reception-side communication unit 23 is a wireless communication interface. The power reception-side communication unit 23 communicates with the power transmission-side communication unit 14. For example, a wireless LAN, Bluetooth (registered trademark), or the like can be used as the power reception-side communication unit 23.

The power reception-side control unit 24 is an electronic control unit including, for example, a CPU, a ROM, a RAM, and the like. The power reception-side control unit 24 controls power supply from the power reception unit 20 to the power storage device B. The power reception-side control unit 24 controls the power reception unit 20, for example, so that a magnitude of power supplied to the power storage device B is changed. The power reception-side control unit 24 controls the power reception unit 20 on the basis of, for example, a control program provided in advance.

The power reception-side control unit 24 acquires a target SOC (a target charging rate) of the power storage device B. The target SOC is, for example, a target value of the SOC of the power storage device B charged with the power supplied from the power reception unit 20 during charging. The target SOC may be a default value previously stored in the power reception-side control unit 24, or may be an input value input to the power reception-side control unit 24 by an operator of the wireless power transfer system 1. For example, although the target SOC can be arbitrarily set, the target SOC can be set to about 90% in consideration of deterioration of the power storage device B. The acquired target SOC is transmitted to the cooling control unit 32 of the cooling system 30.

The power reception-side control unit 24 acquires a set charging time period of the power storage device B. The set charging time period is, for example, a time period from a starting time of charging to a scheduled ending time. The set charging time period may be a default value stored in advance in the power reception-side control unit 24 or may be an input value input to the power reception-side control unit 24 by the operator of the wireless power transfer system 1. As an example, the set charging time period can be a time period (for example, 2 hours) during which charging can be reserved in a commercial facility or the like. The acquired set charging time period is transmitted to the power transmission-side control unit 15 and used for calculating an amount of power transmission necessary for charging the power storage device B with a necessary amount of charge P during the set charging time period. The power transmission-side control unit 15 controls the power transmission unit 10 so that the calculated amount of power transmission is transmitted to the power reception unit 20 during the set charging time period from the start time.

For example, if the charging is completed before the set charging time period elapses from the starting time, power charged into the power storage device B may be lost by self-discharging during a period from the completion of charging to the scheduled end time. In this respect, the power transmission-side control unit 15 controls the power transmission unit 10 so that the calculated amount of power transmission is transmitted to the power reception unit 20 during the set charging time period from the start time. The completion of the charging before the set charging time period elapses from the start time is prevented. Therefore, it is possible to prevent the power with which the power storage device B is charged from being ineffectively lost by self-discharging. Also, for example, deterioration of the power storage device B may be caused if the charging is completed before the set charging time period elapses from the start time and a full SOC is maintained from the time the charging is completed. Also in this case, because it is prevented that the full SOC state is maintained after charging is completed before the set charging time period elapses from the start time, the deterioration of the power storage device B can be suppressed.

As described above, the cooling system 30 includes the cooling unit 31 and the cooling control unit 32, and is configured to change cooling performance on the basis of the necessary amount of charge P of the power storage device B. According to such an operation, the cooling unit 31 is a cooler that cools at least one of the power reception unit 20 that wirelessly receives power from the power transmission unit 10 and the power storage device B that is charged with the power received by the power reception unit 20. The cooling unit 31 is operated, for example, by power received from the power reception-side power conversion circuit 22. Specifically, the cooling unit 31 is operated by DC power supplied from the power reception-side power conversion circuit 22. The cooling unit 31 may be, for example, a cooler which includes a cooling fan and performs cooling with air cooling, or may be, for example, a cooler which includes a cooling water channel, a cooling water pump, and a cooling fan and performs cooling with water cooling.

The cooling control unit 32 is, for example, an electronic control unit (controller) including a CPU, a ROM, a RAM and the like. The cooling control unit 32 controls the cooling unit 31. The cooling control unit 32 controls, for example, a magnitude of DC power supplied from the power reception-side power conversion circuit 22 to a cooling fan of the cooling unit 31. The cooling control unit 32 controls the cooling unit 31 on the basis of, for example, a control program provided in advance. Here, as an example, the cooling control unit 32 controls the operation of the cooling unit 31 so that an amount of cooled heat per unit time (hereinafter referred to as a cooling speed) in the cooling unit 31 is constant when the cooling unit 31 is operating. In the present embodiment, the term "speed of cooling by the cooling unit 31 is constant" indicates that the amount of cooled heat per unit time in which the cooling unit 31 cools the power reception unit 20 and the power storage device B is constant regardless of temperature rising rates of the power reception unit 20 and the power storage device B.

The cooling control unit 32 executes a cooling control process for controlling the cooling unit 31 on the basis of the necessary amount of charge P of the power storage device B. Specifically, the cooling control unit 32 calculates the necessary amount of charge P on the basis of a difference (hereinafter referred to as an SOC deviation) between the target SOC of the power storage device B and the present SOC of the power storage device B detected by the charging rate sensor 42. Here, the cooling control unit 32 uses the SOC deviation as the necessary amount of charge P. The method of calculating the necessary amount of charge P is not limited to this example. For example, the SOC deviation may be further multiplied by a coefficient or the like, and may be calculated in another calculation method using a ratio between the target SOC of the power storage device B and the present SOC of the power storage device B or the like.

The cooling control unit 32 determines whether or not the necessary amount of charge P is greater than or equal to predetermined power $P_C$. The predetermined power $P_C$ is an amount of power to be supplied to the power storage device B when a part of power received by the power reception unit 20 is supplied to the cooling unit 31 so that the cooling unit 31 continues to cool the power storage device B during the set charging time period. The cooling control unit 32 can determine whether it is preferable to prioritize charging over cooling or whether charging will be complete even if cooling continues so as to charge the power storage device B within the set charging time period by determining whether or not the necessary amount of charge P is greater than or equal to the predetermined power $P_C$. The amount of power consumed by the cooling unit 31 (power consumption) to continue to cool the power storage device B can be obtained by multiplying a predetermined power consumption per unit time by the set charging time period. Also, the power consumption when the cooling unit 31 cools the power storage device B so that a cooling speed is constant at a specified value may be obtained through simulation on the basis of the present temperature $T_B$ of the power storage device B. The predetermined power $P_C$ is obtained by subtracting the above-described power consumption from a maximum amount of power to be received by the power reception unit 20 during the set charging time period.

The cooling control unit 32 determines whether or not the temperature $T_A$ of the power reception unit 20 detected by the temperature sensor 41 is greater than or equal to a first temperature threshold value $T_{Ath}$ if the necessary amount of charge P is greater than or equal to the predetermined power $P_C$. The cooling control unit 32 controls the operation of the cooling unit 31 on the basis of the determination result. Specifically, if the necessary amount of charge P is greater than or equal to the predetermined power $P_C$ and the temperature $T_A$ of the power reception unit 20 is greater than or equal to the first temperature threshold value $T_{Ath}$, the cooling control unit 32 controls the cooling unit 31 so that the power reception unit 20 is cooled. The first temperature threshold value $T_{Ath}$ is a temperature threshold value less than or equal to the allowable temperature $T_{AM}$ of the power reception unit 20. The cooling control unit 32 sets the first temperature threshold value $T_{Ath}$ to a larger value in a range of the allowable temperature $T_{AM}$ or less as the necessary amount of charge P increases. As an example, the first temperature threshold value $T_{Ath}$ may be set according to the necessary amount of charge P by a map stored in advance in the cooling control unit 32. A map value of the first temperature threshold value $T_{Ath}$ may be set to a value which is a predetermined temperature lower than the allowable temperature $T_{AM}$ if the necessary amount of charge P is equal to the predetermined power $P_C$, and may be set to monotonously increase in the range of the allowable temperature $T_{AM}$ or less as the necessary amount of charge P increases.

Also, if the necessary amount of charge P is greater than or equal to the predetermined power $P_C$ and the temperature $T_B$ of the power storage device B detected by the temperature sensor 43 is greater than or equal to a second temperature threshold value $T_{Bth}$, the cooling control unit 32 controls the cooling unit 31 so that the power storage device B is cooled. The second temperature threshold value $T_{Bth}$ is a temperature threshold value less than or equal to the allowable temperature $T_{BM}$ of the power storage device B. The cooling control unit 32 sets the second temperature threshold value $T_{Bth}$ to a larger value in a range of the allowable temperature $T_{BM}$ or less as the necessary amount of charge P increases. As an example, the second temperature threshold value $T_{Bth}$ may be set according to the necessary amount of charge P by a map stored in advance in the cooling control unit 32. The map value of the second temperature threshold value $T_{Bth}$ may be set to a value which is a predetermined temperature lower than the allowable temperature $T_{BM}$ when the necessary amount of charge P is equal to the predetermined power $P_C$, and may be set to monotonously increase in the range of the allowable temperature $T_{BM}$ or less as the necessary amount of charge P increases.

If the necessary amount of charge P is greater than or equal to the predetermined power $P_C$, the temperature $T_A$ of the power reception unit 20 detected by the temperature sensor 41 is less than the first temperature threshold value $T_{Ath}$, and the temperature $T_B$ of the power storage device B detected by the temperature sensor 43 is less than the second temperature threshold value $T_{Bth}$, the cooling control unit 32 controls the cooling unit 31 so that the cooling unit 31 is stopped and does not cool the power reception unit 20 and the power storage device B.

On the other hand, the cooling control unit 32 controls the cooling unit 31 so that the power storage device B is cooled if the necessary amount of charge P is less than the predetermined power $P_C$. In this case, there is a margin for using power for operating the cooling unit 31 to cool the power storage device B. Therefore, if the necessary amount of charge P is less than the predetermined power $P_C$, the power storage device B is actively cooled.

If the necessary amount of charge P is less than the predetermined power $P_C$, the cooling control unit 32 calculates a target temperature $T_{AX}$ and controls the cooling unit 31 so that the temperature $T_A$ of the power reception unit 20 detected by the temperature sensor 41 becomes the target temperature $T_{AX}$. The target temperature $T_{AX}$ is the temperature $T_A$ of the power reception unit 20 at which power efficiency is maximized. Power efficiency between power transmission and reception refers to a ratio of power at a certain position of the power receiver 3 including the power reception coil 21a to power at a certain position of the power transmitter 2 including the power transmission coil 12a. The power efficiency is, for example, a ratio of power of an output of a rectifier of the power receiver 3 to power of an input of an inverter of the power transmitter 2. If the necessary amount of charge P is less than the predetermined power $P_C$, there is a margin for using the power for operating the cooling unit 31 to cool the power reception unit 20. Thus, if the necessary amount of charge P is less than the predetermined power $P_C$, the power reception unit 20 is actively cooled.

The cooling control unit 32 executes a temperature threshold value setting process of setting the first temperature threshold value $T_{Ath}$ and the second temperature threshold value $T_{Bth}$ on the basis of a misalignment between power transmission and reception, and of the temperature rising rates of the power reception unit 20 and the power storage device B.

Specifically, the cooling control unit 32 sets the first temperature threshold value $T_{Ath}$ of when the misalignment between power transmission and reception is in the first state to a value smaller than the first temperature threshold value $T_{Ath}$ of when the misalignment is in the second state in which the misalignment between power transmission and reception is less than in the first state. The first state is, for example, a state in which an amount of misalignment d (a separation distance) between power transmission and reception is $d_1$. The second state is, for example, a state in which the amount of misalignment d (a separation distance) is $d_2$, which is smaller than $d_1$. As an example, the first temperature threshold value $T_{Ath}$ may be corrected by a correction term $\Delta T_{Ad}$ set according to the amount of misalignment d by a map stored in advance in the cooling control unit 32. The correction term $\Delta T_{Ad}$ is a correction width for performing subtraction correction on the first temperature threshold value $T_{Ath}$. A map value of the correction term $\Delta T_{Ad}$ is set to 0 when there is no misalignment between power transmission and reception (when the amount of misalignment d=0), and may be set to monotonously increase as the amount of misalignment d increases.

The cooling control unit 32 calculates a first temperature rising rate $R_A$ which is a temperature rising rate of the power reception unit 20 on the basis of the temperature $T_A$ of the power reception unit 20 detected by the temperature sensor 41. The cooling control unit 32 calculates a second temperature rising rate $R_B$ which is a temperature rising rate of the power storage device B on the basis of the temperature $T_B$ of the power storage device B detected by the temperature sensor 43. The temperature rising rate is a temperature rise per unit time (that is, a temperature rising speed). If the first temperature rising rate $R_A$ is less than the second temperature rising rate $R_B$, the cooling control unit 32 sets the first temperature threshold value $T_{Ath}$ to a value larger than the second temperature threshold value $T_{Bth}$. In this case, the cooling control unit 32 may use, for example, a value obtained by adding a predetermined addition value (a positive numerical value) to the second temperature threshold value $T_{Bth}$ as the first temperature threshold value $T_{Ath}$. On the other hand, if the first temperature rising rate $R_A$ is greater than the second temperature rising rate $R_B$, the cooling control unit 32 sets the first temperature threshold value $T_{Ath}$ to a value smaller than the second temperature threshold value $T_{Bth}$. In this case, the cooling control unit 32 may use, for example, a value obtained by subtracting a predetermined subtraction value (a positive numerical value) from the second temperature threshold value $T_{Bth}$ as the first temperature threshold value $T_{Ath}$.

The lower the first temperature rising rate $R_A$ is, the easier it is to suppress the increase in the temperature of the power reception unit 20. Specifically, as the first temperature rising rate $R_A$ decreases, the amount of heat generated by the power reception unit 20 during a fixed time period is decreased so that the amount of cooling heat for cooling the power reception unit 20 during the fixed time period (a product of the cooling speed and the fixed time period) can be reduced. Likewise, the lower the second temperature rising rate $R_B$ is, the easier it is to suppress the increase in the temperature of the power storage device B. Specifically, as the second temperature rising rate $R_B$ decreases, the amount of heat generated by the power storage device B during the fixed time period is decreased so that the amount of cooling heat for cooling the power storage device B during the fixed time period can be reduced. In the present embodiment, the cooling control unit 32 controls the operation of the cooling unit 31 so that the cooling speed of the cooling unit 31 is constant when the cooling unit 31 is operating. That is, as the first temperature rising rate $R_A$ decreases, a speed at which the power reception unit 20 is cooled by the cooling unit 31 is relatively increased so that the cooling time of the power reception unit 20 is shortened. Likewise, as the second temperature rising rate $R_B$ decreases, a speed at which the power storage device B is cooled by the cooling unit 31 is relatively increased so that the cooling time of the power storage device B is shortened.

Figure 2:
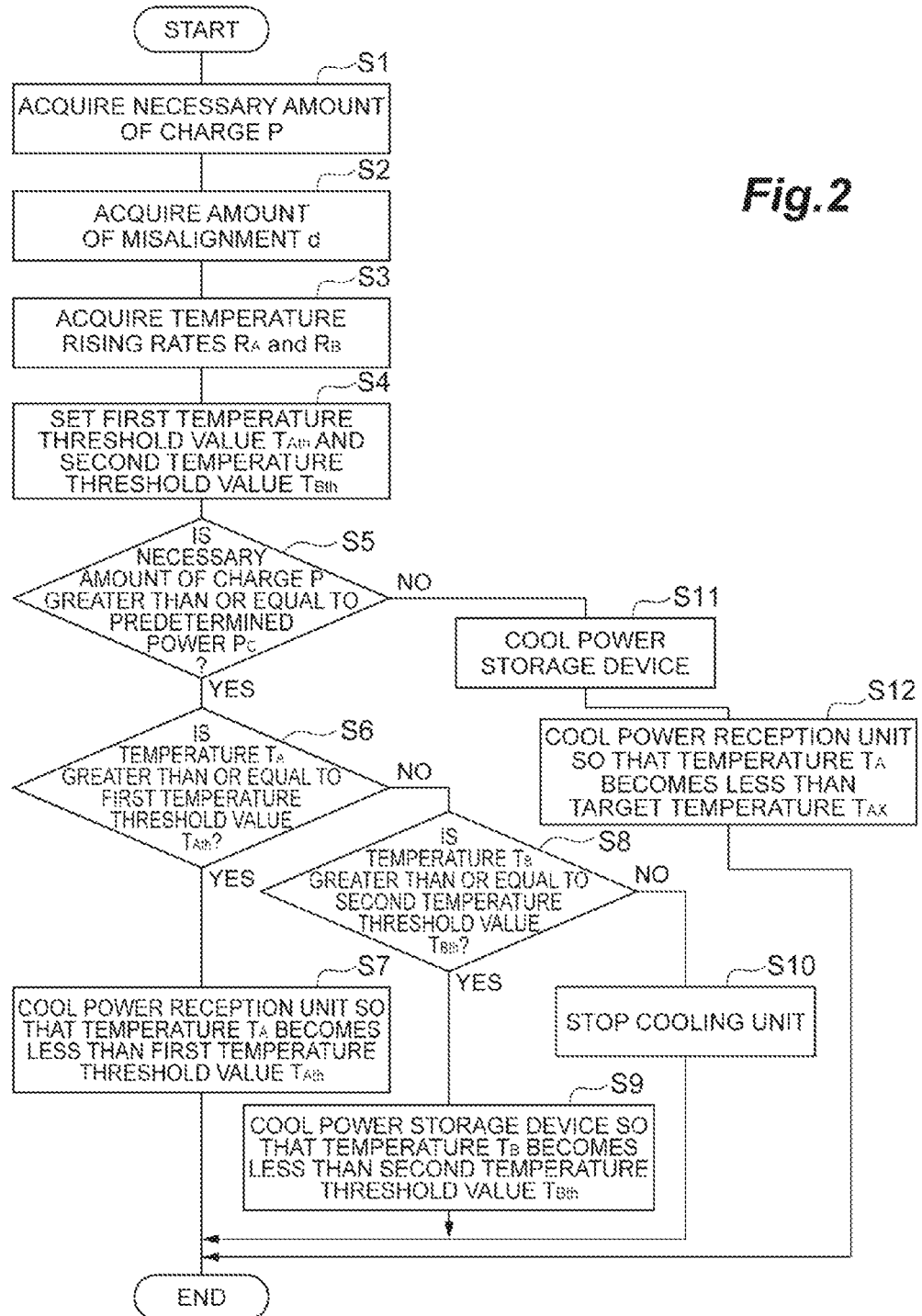
FIG. 2 is a flowchart illustrating a cooling control process.

Next, the cooling control process and the temperature threshold setting process by the cooling control unit 32 will be described with reference to FIG. 2. As illustrated in FIG. 2, the necessary amount of charge P is first acquired by the cooling control unit 32 (step S1). The cooling control unit 32 acquires the amount of misalignment d between power transmission and reception (step S2). The first temperature rising rate $R_A$ and the second temperature rising rate $R_B$ are acquired by the cooling control unit 32 (step S3). Then, the first temperature threshold value $T_{Ath}$ and the second temperature threshold value $T_{Bth}$ are set by the cooling control unit 32 (step S4).

In step S4, if the necessary amount of charge P is greater than or equal to the predetermined power $P_C$, the cooling control unit 32 acquires the first temperature threshold value $T_{Ath}$ and the second temperature threshold value $T_{Bth}$ according to the necessary amount of charge P from a map and sets the first temperature threshold value $T_{Ath}$ and the second temperature threshold value $T_{Bth}$. That is, the first temperature threshold value $T_{Ath}$ is set by the cooling control unit 32 so that the first temperature threshold value $T_{Ath}$ increases in the range of the allowable temperature $T_{AM}$ or less as the necessary amount of charge P increases. Also, if the necessary amount of charge P is greater than or equal to the predetermined power $P_C$, the cooling control unit 32 sets the second temperature threshold value $T_{Bth}$ so that the second temperature threshold value $T_{Bth}$ increases in the range of the allowable temperature $T_{BM}$ or less as the necessary amount of charge P increases.

Also, in step S4, the cooling control unit 32 acquires the correction term $\Delta T_{Ad}$ corresponding to the amount of misalignment d between power transmission and reception from the map, and corrects the first temperature threshold value $T_{Ath}$. That is, the first temperature threshold value $T_{Ath}$ is set by the cooling control unit 32 so that the first temperature threshold value $T_{Ath}$ of when the misalignment between power transmission and reception is in the first state is less than the first temperature threshold value $T_{Ath}$ of when the misalignment is in the second state in which the misalignment between power transmission and reception is less than in the first state.

Also, in step S4, if the first temperature rising rate $R_A$ is less than the second temperature rising rate $R_B$, the first temperature threshold value $T_{Ath}$ is set by the cooling control unit 32 to be greater than the second temperature threshold value $T_{Bth}$. On the other hand, if the first temperature rising rate $R_A$ is greater than the second temperature rising rate $R_B$, the first temperature threshold value $T_{Ath}$ is set by the cooling control unit 32 to be less than the second temperature threshold value $T_{Bth}$.

Subsequently, the cooling control unit 32 determines whether or not the necessary amount of charge P is greater than or equal to the predetermined power $P_C$ (step S5). If it is determined that the necessary amount of charge P is greater than or equal to the predetermined power $P_C$, the cooling control unit 32 determines whether or not the temperature $T_A$ of the power reception unit 20 is greater than or equal to the first temperature threshold value $T_{Ath}$ (step S6). If it is determined that the temperature $T_A$ of the power reception unit 20 is greater than or equal to the first temperature threshold value $T_{Ath}$, the cooling unit 31 is controlled by the cooling control unit 32 and the power reception unit 20 is cooled by the cooling unit 31 so that the temperature $T_A$ of the power reception unit 20 becomes less than the first temperature threshold value $T_{Ath}$ (step S7).

On the other hand, if it is determined that the temperature $T_A$ of the power reception unit 20 is less than the first temperature threshold value $T_{Ath}$ in the above-described step S6, the cooling control unit 32 determines whether the temperature $T_B$ of the power storage device B is greater than or equal to the second temperature threshold value $T_{Bth}$ (step S8). When it is determined that the temperature $T_B$ of the power storage device B is greater than or equal to the second temperature threshold value $T_{Bth}$, the cooling control unit 32 controls the cooling unit 31 and the power storage device B is cooled by the cooling unit 31 so that the temperature $T_B$ of the power storage device B becomes lower than the second temperature threshold value $T_{Bth}$ (step S9).

If it is determined that the temperature $T_B$ of the power storage device B is less than the second temperature threshold value $T_{Bth}$ in the above-described step S8, the cooling unit 31 is controlled by the cooling control unit 32 and the cooling unit 31 is stopped (step S10). That is, the power reception unit 20 and the power storage device B are not cooled.

On the other hand, if it is determined that the necessary amount of charge P is less than the predetermined power $P_C$ in the above-described step S5, the cooling unit 31 is controlled by the cooling control unit 32 and the power storage device B is cooled (step S11). Then, the cooling control unit 32 calculates the target temperature $T_{AX}$, and the cooling unit 31 is controlled so that the temperature $T_A$ of the power reception unit 20 becomes the target temperature $T_{AX}$ (step S12).

Figure 3:
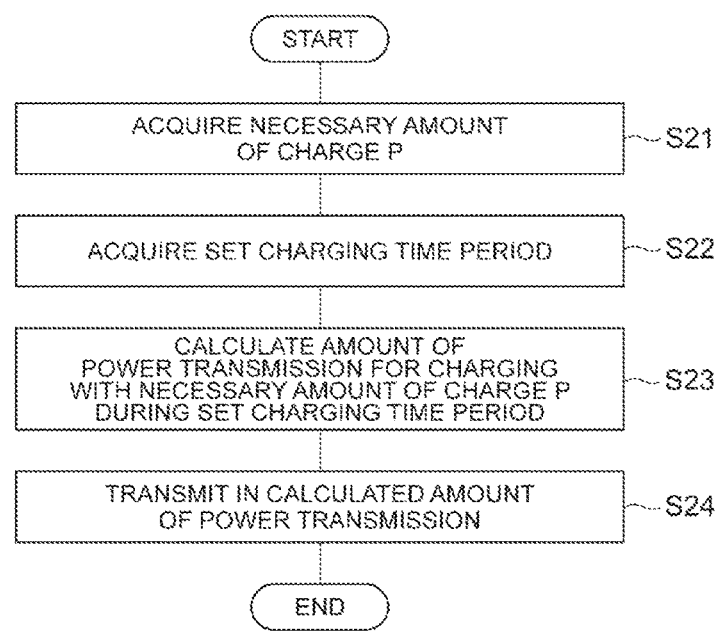
FIG. 3 is a flowchart illustrating a power transmission amount calculation process.

Next, the power transmission amount calculation process will be described with reference to FIG. 3. As illustrated in FIG. 3, the necessary amount of charge P is first acquired by the cooling control unit 32 (step S21). Subsequently, the power reception-side control unit 24 acquires a set charging time period of the power storage device B (step S22). Then, the power transmission-side control unit 15 calculates an amount of power transmission necessary for charging the power storage device B with the necessary amount of charge P during the set charging time period (step S23). Subsequently, the power transmission-side control unit 15 controls the power transmission unit 10 so that the calculated amount of power transmission is transmitted to the power reception unit 20 during the set charging time period from a start time (step S24).

As described above, the cooling system 30 according to the present embodiment includes the cooling control unit 32 that controls the cooling unit 31 on the basis of the necessary amount of charge P of the power storage device B. Heat generation related to power reception and charging (a degree to which the power reception unit 20 and the power storage device B are heated) corresponds to the amount of power with which the power storage device B is charged (that is, the necessary amount of charge P). Thus, for example, by controlling the cooling unit 31 so that the cooling unit 31 is not operated in the case of the necessary amount of charge P corresponding to heat generation of a degree which does not require cooling, it is possible to prevent the power with which the power storage device B is charged from decreasing. Therefore, it is possible to perform cooling while efficiently charging.

The cooling control unit 32 calculates the necessary amount of charge P on the basis of a difference between a target SOC of the power storage device B and the present SOC of the power storage device B. Thereby, the necessary amount of charge P can be easily calculated from the difference between the target SOC of the power storage device B and the present SOC of the power storage device B.

The cooling control unit 32 controls the cooling unit 31 so that the power reception unit 20 is cooled if the temperature $T_A$ of the power reception unit 20 is greater than or equal to the first temperature threshold value $T_{Ath}$. The cooling control unit 32 controls the cooling unit 31 so that the power storage device B is cooled if the temperature $T_B$ of the power storage device B is greater than or equal to the second temperature threshold value $T_{Bth}$. The cooling control unit 32 sets the first temperature threshold value $T_{Ath}$ and the second temperature threshold value $T_{Bth}$ to larger values as the necessary amount of charge P increases. In this manner, for example, by setting the first temperature threshold value $T_{Ath}$ to a value less than or equal to the allowable temperature $T_{AM}$ of the power reception unit 20, a failure of the power reception unit 20 is suppressed because the power reception unit 20 is cooled by the cooling unit 31 so that the temperature $T_A$ of the power reception unit 20 becomes less than the allowable temperature $T_{AM}$. Deterioration of the power storage device B is suppressed, because the power storage device B is cooled by the cooling unit 31 so that the temperature $T_B$ of the power storage device B becomes less than the allowable temperature $T_{BM}$ by setting the second temperature threshold value $T_{Bth}$ to a value less than or equal to the allowable temperature $T_{BM}$ of the power storage device B. If the temperature $T_A$ of the power reception unit 20 is less than the first temperature threshold value $T_{Ath}$ and the temperature $T_B$ of the power storage device B is less than the second temperature threshold value $T_{Bth}$, power for operating the cooling unit 31 is not required because the power reception unit 20 and the power storage device B are not cooled. Therefore, it is possible to suppress a failure of the power reception unit 20 and degradation of the power storage device B while efficiently performing charging.

The power reception unit 20 includes the power reception coil 21a that wirelessly receives power from the power transmission coil 12a of the power transmission unit 10. The cooling control unit 32 sets the first temperature threshold value $T_{Ath}$ of when the misalignment between power transmission and reception is in the first state to a value smaller than the first temperature threshold value $T_{Ath}$ of when the misalignment is in the second state in which the misalignment between power transmission and reception is less than in the first state. If the misalignment between power transmission and reception increases, the heat generation of the power reception unit 20 at a time of power reception may increase. Therefore, it is possible to reliably cool the power reception unit 20 by setting the first temperature threshold value $T_{Ath}$ of when the misalignment between power transmission and reception is in the first state to a value smaller than the first temperature threshold value $T_{Ath}$ of when the misalignment is in the second state in which the misalignment between power transmission and reception is less than in the first state.

The cooling control unit 32 calculates the first temperature rising rate $R_A$, which is a temperature rising rate of the power reception unit 20, and the second temperature rising rate $R_B$, which is a temperature rising rate of the power storage device B. If the first temperature rising rate $R_A$ is less than the second temperature rising rate $R_B$, the cooling control unit 32 sets the first temperature threshold value $T_{Ath}$ to a value larger than the second temperature threshold value $T_{Bth}$. If the first temperature rising rate $R_A$ is greater than the second temperature rising rate $R_B$, the cooling control unit 32 sets the first temperature threshold value $T_{Ath}$ to a value smaller than the second temperature threshold value $T_{Bth}$.

In the present embodiment, the cooling control unit 32 controls the operation of the cooling unit 31 so that the cooling speed of the cooling unit 31 is constant when the cooling unit 31 is operating. That is, as the first temperature rising rate $R_A$ decreases, a speed at which the power reception unit 20 is cooled by the cooling unit 31 is relatively increased so that the cooling time of the power reception unit 20 is shortened. Likewise, as the second temperature rising rate $R_B$ decreases, a speed at which the power storage device B is cooled by the cooling unit 31 is relatively increased so that the cooling time of the power storage device B is shortened. That is, as the first temperature rising rate $R_A$ decreases, the first temperature threshold value $T_{Ath}$ is increased and a start of cooling by the cooling unit 31 can be delayed. Likewise, the start of cooling by the cooling unit 31 can be delayed by the increase of the second temperature threshold value $T_{Bth}$ due to the second temperature rising rate $R_B$ decreases. Thereby, the operation of the cooling unit 31 is further suppressed, and it is possible to further suppress the reduction of the power with which the power storage device B is charged.

The cooling control unit 32 calculates the target temperature $T_{AX}$ of the power reception unit 20 at which power efficiency is maximized. The cooling control unit 32 controls the cooling unit 31 so that the temperature $T_A$ of the power reception unit 20 becomes equal to the target temperature $T_{AX}$ if the necessary amount of charge P is less than the predetermined power $P_C$. In this case, because the necessary amount of charge P is small, there is a margin for using power for cooling the power reception unit 20. Consequently, it is possible for the cooling unit 31 to actively perform cooling so that the power efficiency is maximized. Also, the power efficiency is maximized so that heat generation of the power reception unit 20 can be reduced and the power for use in cooling can be suppressed.

The cooling control unit 32 controls the cooling unit so that the power storage device B is cooled if the necessary amount of charge P is less than the predetermined power $P_C$. In this case, because the necessary amount of charge P is small, there is a margin for using the power for cooling the power storage device B. By the cooling unit 31 actively cooling the power storage device B, deterioration of the power storage device B can be suppressed.

The wireless power transfer system 1 according to the present embodiment includes the above-described cooling system 30, the power transmission unit 10 that wirelessly transmits power to the power reception unit 20, the power reception unit 20, and the power storage device B. In this wireless power transfer system 1, a heat generation (a degree to which the power reception unit 20 and the power storage device B are heated) related to power reception and charging corresponds to an amount of power with which the power storage device B is charged (that is, the necessary amount of charge P). Thus, for example, in the case of the necessary amount of charge P corresponding to heat generation of a degree which does not require cooling, it is possible to prevent the decrease of the power with which the power storage device B is charged by controlling the cooling unit 31 so that the cooling unit 31 is not operated. Therefore, it is possible to perform cooling while efficiently charging.

Although an embodiment of the present invention has been described above, the present invention is not limited to the above-described embodiment. For example, in the above-described embodiment, the cooling control unit 32 is included in the cooling system 30, but the cooling control unit 32 may be included in, for example, the power receiver 3, and may be configured as one function of the power reception-side control unit 24.

In the above embodiment, the cooling unit 31 is configured to cool the power reception unit 20, but the cooling unit 31 may be configured to individually cool components (for example, the power reception coil 21a) constituting the power reception unit 20.

In the above embodiment, the cooling control unit 32 controls the cooling unit 31 so that the cooling speed of the cooling unit 31 is constant when the cooling unit 31 is activated, but the cooling control unit 32 may control the cooling unit 31 so that the cooling speed is changed. In this case, for example, as the first temperature rising rate $R_A$ or the second temperature rising rate $R_B$ decreases, the cooling speed of the cooling unit 31 decreases to suppress the operation of the cooling unit 31, and a decrease in the power with which the power storage device B is charged may be suppressed.

Although the cooling control unit 32 sets the first temperature threshold value $T_{Ath}$ and the second temperature threshold value $T_{Bth}$ on the basis of the misalignment between power transmission and reception, the temperature rising rate of the power reception unit 20, and the temperature rising rate of the power storage device B in the above-described embodiment. The first temperature threshold value $T_{Ath}$ and the second temperature threshold value $T_{Bth}$ may be set on the basis of some of the misalignment and temperature rising rates. For example, the cooling control unit 32 may set the first temperature threshold value $T_{Ath}$ and the second temperature threshold value $T_{Bth}$ on the basis of only the misalignment between power transmission and reception, or may set the first temperature threshold value $T_{Ath}$ and the second temperature threshold value $T_{Bth}$ on the basis of only the temperature rising rate of the power reception unit 20 and the temperature rising rate of the power storage device B.

In the above-described embodiment, the cooling control unit 32 controls the cooling unit 31 so that the power storage device B is cooled if the necessary amount of charge P is less than the predetermined power $P_C$, calculates the target temperature $T_{AX}$, and controls the cooling unit 31 so that the temperature $T_A$ of the power reception unit 20 becomes the target temperature T. However, if the necessary amount of charge P is less than the predetermined power $P_C$, the cooling control unit 32 may control the cooling unit 31 so that the power storage device B is not cooled, or may control the cooling unit 31 so that the power reception unit 20 is not cooled. The cooling control unit 32 may control the cooling unit 31 so that both the power storage device B and the power reception unit 20 are not cooled if the necessary amount of charge P is less than the predetermined power $P_C$.

REFERENCE SIGNS LIST

1 Wireless power transfer system
10 Power transmission unit
20 Power reception unit
30 Cooling system
31 Cooling unit
32 Cooling control unit (control unit)
B Power storage device

The invention claimed is:

1. A cooling system comprising:
a cooling unit configured to cool at least one of a power reception unit configured to wirelessly receive power from a power transmission unit and a power storage unit configured to store the power received by the power reception unit; and
a controller configured to control the cooling unit,
wherein the cooling unit is operated by the power received by the power reception unit,
wherein the controller controls the cooling unit on the basis of a necessary amount of charge of the power storage unit
wherein the controller controls the cooling unit so that the power reception unit is cooled if a temperature of the power reception unit is greater than or equal to a first temperature threshold value,
wherein the controller controls the cooling unit so that the power storage unit is cooled if a temperature of the power storage unit is greater than or equal to a second temperature threshold value, and
wherein the controller sets the first temperature threshold value and the second temperature threshold value to larger values as the necessary amount of charge increases.

2. The cooling system according to claim 1, wherein the controller calculates the necessary amount of charge on the basis of a difference between a target charging rate of the power storage unit and a present charging rate of the power storage unit.

3. The cooling system according to claim 1,
wherein the power reception unit includes a power reception coil configured to wirelessly receive the power from a power transmission coil of the power transmission unit, and
wherein the controller sets the first temperature threshold value of when a misalignment between the power transmission coil and the power reception coil is in a first state to a value smaller than a first temperature threshold value of when the misalignment is in a second state in which the misalignment is less than in the first state.

4. The cooling system according to claim 1,
wherein the controller calculates a first temperature rising rate which is a temperature rising rate of the power reception unit and a second temperature rising rate which is a temperature rising rate of the power storage unit,
wherein the controller sets the first temperature threshold value to a value larger than the second temperature threshold value if the first temperature rising rate is less than the second temperature rising rate, and
wherein the controller sets the first temperature threshold value to a value smaller than the second temperature threshold value if the first temperature rising rate is greater than the second temperature rising rate.

5. The cooling system according to claim 1,
wherein the controller calculates a target temperature of the power reception unit at which power efficiency is maximized, and
wherein the controller controls the cooling unit so that a temperature of the power reception unit becomes the target temperature if the necessary amount of charge is less than a predetermined power.

6. The cooling system according to claim 5, wherein the controller controls the cooling unit so that the power storage unit is cooled if the necessary amount of charge is less than the predetermined power.

7. A wireless power transfer system comprising:
the cooling system according to claim 1;
the power transmission unit configured to wirelessly transmit the power to the power reception unit;
the power reception unit; and
the power storage unit.

8. The cooling system according to claim 1, wherein the controller determines whether or not a necessary amount of charge is greater than or equal to predetermined power and controls the cooling unit based on the determination result, and
wherein the predetermined power is an amount of power to be supplied to a power storage device when a part of power received by the power reception unit is supplied to the cooling unit so that the cooling unit continues to cool the power storage device during the set charging time period.

9. The cooling system according to claim 8, wherein the controller controls the cooling unit so that the power storage device is cooled if the necessary amount of charge is less than the predetermined power.

10. The cooling system according to claim 8,
wherein the controller controls the cooling unit so that the power reception unit is cooled, if the necessary amount of charge is greater than or equal to the predetermined power and a temperature of the power reception unit is greater than or equal to a first temperature threshold value, and wherein the controller controls the cooling unit so that the power storage device is cooled, if the necessary amount of charge is greater than or equal to the predetermined power and a temperature of the power storage device is greater than or equal to a second temperature threshold value.

* * * * *